June 26, 1934. F. D. GRUND Re. 19,223

DOG RELEASING DEVICE FOR DOORLATCHES

Original Filed Sept. 12, 1930

Inventor:
Fletcher D. Grund, Deceased.
by The American Swiss Company, Assignee,
by Adolph F. Seubert, President,
by Owen & Owen
Attorneys Reissued June 26, 1934

Re. 19,223

UNITED STATES PATENT OFFICE 19,223

DOG RELEASING DEVICE FOR DOOR-LATCHES

Fletcher D. Grund, deceased, late of Weston, Ohio, by the American Swiss Company, Toledo, Ohio, assignee Original No. 1,827,982, dated October 20, 1931, Serial No. 481,390, September 12, 1930. Application for reissue October 20, 1933, Serial No. 694,421

6 Claims. (Cl. 292—169)

This invention relates to door latches, but more particularly to latches adapted for use on automobiles and other vehicles, and an object is to produce a latch which automatically releases the outside retractor upon retraction of the latch bolt from the inside as upon slamming the door, so that should the latch be dogged or locked and then the door closed, the action of closing the door operates to move or release the locking or dogging element away from locking position.

Figure 1:
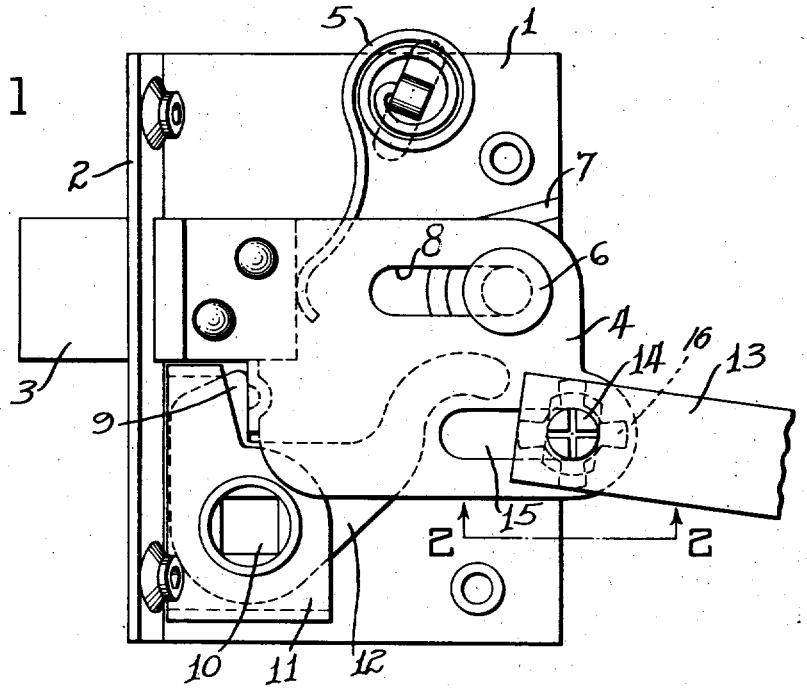
Figure 2:
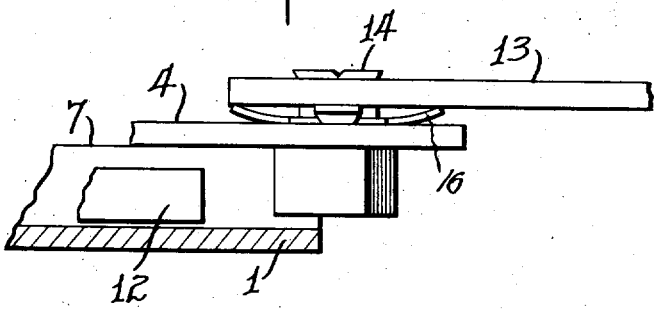

Further objects will hereinafter appear, and by way of illustration but not of limitation, an embodiment of the invention is shown on the accompanying drawing, in which:

Figure 1 is a side elevation of a door latch, the central portion of the strap or link leading to the remote control unit being broken away; and Figure 2 is an enlarged sectional view on the line 2—2 of Figure 1, showing the connection between the remote-operated strap and the latch bolt.

The illustrated embodiment of the invention comprises a latch unit having a back plate, provided with an upstanding face plate 2, which is apertured to receive a latch bolt head 3. The head 3 is riveted to a bolt plate 4 and a spiral spring 5 bears against the rear face of the bolt head 3 urging the same to projected or latching position. A headed pin 6 mounted on an embossed part 7 of the back plate 1 extends into an elongate slot 8 in the bolt plate, thereby guiding the movement of the latch bolt over the back plate.

For retracting the latch bolt from the outside, a roll back 9 having a squared handle-receiving opening 10, is mounted on the back plate 1, a cover plate 11 extending over the roll back to retain the same in position. Projecting from the hub of the roll back is a hook-shaped arm 12 for a purpose hereinafter described.

It will be noted that the strap or link 13 is broken away on the drawing, but may extend in the usual manner to a remote control handle (not shown). On the inner end of the strap 13 is a rivet or stud 14, which projects at right angles from the strap and extends into an elongate slot 15 formed in the bolt plate 4. To hold the parts in proper position and eliminate rattling, a spring washer 16 is mounted on the stud 14 between the bolt plate 4 and strap 13.

It will be apparent from an inspection of Figure 1 that by movement of the rivet 14 into engagement with the right hand edge of the slot 15, retraction of the latch bolt by the strap 13 can be accomplished. It is further apparent that movement of the strap 13 in non-bolt retracting direction (to the left of Figure 1) can be accomplished when the latch bolt is in projected or latching position. When the rivet is moved to a position beneath the outer end portion of the arm 12, movement of the roll back 9 is blocked, or in other words, dogging of the roll back is effected.

A cardinal feature of this invention resides in so constructing and arranging the parts that when the door is slammed the dogging element (rivet 14, in this case) is automatically moved away from dogging position, thereby releasing the roll back. As shown, the length of the elongate slot 15 is so chosen with relation to the end portion of the arm 12, that when the rivet 14 is in its left hand position and the bolt is retracted, as by slamming the door, the left hand edge of the slot 15 positively moves the rivet away from the dogging arm 12. In this manner, accidental locking of the door from the inside before slamming is rendered ineffective and in order to lock the door, the latter must be in closed position before the rivet 14 is moved to dogging position.

Numerous changes in details of construction, arrangement and operation may be effected without departing from the spirit of the invention, especially as defined by the claims.

What is claimed is:

1. In a door latch, a latch bolt, a plate rigid with said bolt and having therein a slot extending in the direction of movement of said bolt, outside retracting means including a roll back for said bolt having a contact surface movable laterally across said slot when the roll back is operated to retract the bolt, and inside retracting means including a retracting device having a member extending through said slot and the end of said member being in the path of said surface when said member is in the end of the slot toward the projected bolt, the parts being so proportioned that, upon movement of the bolt to normal retracted position, said end of the slot forces said member out of the path of said contact surface.

2. A latch mechanism for a door including a latch bolt, and two independently operable members for retracting said bolt, one of said members being separate from and movable independently of the bolt to dog the other, and responsive to displacement of the bolt in non-latching movement, as by closing of the door to undog said other.

3. In a door latch mechanism, a latch bolt, means for retracting the bolt, retracting means separate from the bolt including means for dogging said first retracting means, and means operable by a part of the bolt when the dogging means is in operative dogging position for moving said dogging means to ineffective position so that said first retracting means will be free to retract the bolt.

4. In a door latch mechanism, a latch bolt, means for retracting the bolt, and means for dogging said retracting means including a retracting member movable by the bolt from operative dogging relation with said retracting means to an ineffective position.

5. A latch mechanism comprising a latch bolt, pivotally mounted means for actuating the bolt, and a member separate from said bolt for alternately actuating said bolt and responsive to movement of said bolt to be actuated thereby, and disposable in certain of its positions to render said actuating means inoperative when said member is neither actuating nor being actuated by said bolt and to render said actuating means operative when it is either actuating or being actuated by said bolt.

6. A latch mechanism for a door including a latch bolt, and two independently operable members for retracting said bolt, one of said members being separate from and movable independently of the bolt to render the other member ineffective to retract the bolt, and responsive to displacement of the bolt in non-latching movement as by closing of the door, to render said other member effective to retract the bolt.

FLETCHER D. GRUND,
*Deceased,*
By THE AMERICAN SWISS COMPANY,
By A. F. SEUBERT,
*President.*